United States Patent
Ohara et al.

(10) Patent No.: US 7,565,474 B2
(45) Date of Patent: Jul. 21, 2009

(54) COMPUTER SYSTEM USING SERIAL CONNECT BUS, AND METHOD FOR INTERCONNECTING A PLURALITY OF CPU USING SERIAL CONNECT BUS

(75) Inventors: Shigeyoshi Ohara, Kawasaki (JP); Kazunori Masuyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/168,440

(22) Filed: Jun. 29, 2005

(65) Prior Publication Data
US 2006/0200614 A1 Sep. 7, 2006

(30) Foreign Application Priority Data
Mar. 4, 2005 (JP) .............................. 2005-060807

(51) Int. Cl.
*G06F 13/00* (2006.01)
(52) U.S. Cl. .................... 710/316; 710/305; 711/121
(58) Field of Classification Search ......... 710/316–317, 710/305–306; 711/121
See application file for complete search history.

(56) References Cited

U.S. PATENT DOCUMENTS

| | | | |
|---|---|---|---|
| 5,812,880 A | 9/1998 | Goto et al. | |
| 6,189,040 B1 | 2/2001 | Oohara | |
| 7,096,308 B2 * | 8/2006 | Main et al. | 710/315 |
| 2005/0246460 A1 * | 11/2005 | Stufflebeam | 710/104 |
| 2006/0018341 A1 * | 1/2006 | Pettey et al. | 370/465 |
| 2006/0149977 A1 * | 7/2006 | Cooper | 713/300 |

FOREIGN PATENT DOCUMENTS

| | | |
|---|---|---|
| JP | 8-249021 | 9/1996 |
| JP | 10-107827 | 4/1998 |
| JP | 2000-183939 | 6/2000 |
| JP | 2000-196648 | 7/2000 |
| JP | 2001-229119 | 8/2001 |

OTHER PUBLICATIONS

Korean Patent Office Action, mailed Sep. 29, 2006, and issued in corresponding Korean Patent Application No. 10-2005-0063522.
Japanese Office Action issued on Feb. 10, 2009 in corresponding Japanese Patent Application 2005-060807.

* cited by examiner

*Primary Examiner*—Clifford H Knoll
*Assistant Examiner*—Kim T Huynh
(74) *Attorney, Agent, or Firm*—Staas & Halsey LLP

(57) ABSTRACT

A computer system enable system operation by hiding the peculiarity of an upstream port of a switch in a computer system in which a plurality of CPU units are interconnected by a PCI Express switch. When a CPU unit, which is connected to the upstream port of a serial connect switch interconnecting the plurality of CPU units, is unable to operate, and the links between the CPU units and the switch cannot be established, a management controller in the switch unit is selected as a device of the upstream port.

19 Claims, 8 Drawing Sheets

FIG. 3

| | |
|---|---|
| The area being routed to CPU unit-3. | 0xFFFF_FFFF_FFFF_FFFF <br> 0xC000_0000_0000_0000 |
| The area being routed to CPU unit-2. | 0xBFFF_FFFF_FFFF_FFFF <br> 0x8000_0000_0000_0000 |
| The area being routed to CPU unit-1. | 0x7FFF_FFFF_FFFF_FFFF <br> 0x4000_0000_0000_0000 |
| The area being routed to CPU unit-0. | 0x3FFF_FFFF_FFFF_FFFF <br> 0x0000_0000_0000_0000 |

COMPUTER SYSTEM USING SERIAL CONNECT BUS, AND METHOD FOR INTERCONNECTING A PLURALITY OF CPU USING SERIAL CONNECT BUS

CROSS-REFERENCE TO RELATED APPLICATIONS

This application is based upon and claims the benefit of priority from the prior Japanese Patent Application No. 2005-060807, filed on Mar. 4, 2005, the entire contents of which are incorporated herein by reference.

BACKGROUND OF THE INVENTION

1. Field of the Invention

The present invention relates to a computer system constituted of a plurality of CPU units interconnected by a serial connect bus, and a method for interconnecting a plurality of CPU units by means of a serial connect bus, and more particularly, a computer system in which units are interconnected by a serial connect switch having an upstream port being set for system initialization, and a method for interconnecting a plurality of CPU units by means of a serial connect bus.

2. Description of the Related Art

In recent years, because of an expanded use of electronic data, data amount to be processed by computer systems is abruptly increasing. To cope with such demand, there is ongoing development on interconnect (internal connection) technology for interconnecting inside the computer system, so as to obtain high-speed and large-capacity data transfer.

Such interconnect technology is employed in both an LSI and a printed circuit board, and is widely utilized as an interconnect means inside the computer system. A typical example having been widely used is a PCI (peripheral component interconnect) bus for parallel data transfer.

FIG. 9 shows a computer system configuration using the conventional PCI bus. A CPU (central processing unit) 100 is connected to a memory (main memory) 104 and an input/output controller (I/O controller) 104 via a memory controller 102. The I/O controller 104 has a plurality of PCI buses 108-1, 108-2. PCI buses 108-1, 108-2 have PCI slots 106-1-106-4.

In these PCI slots 106-1-106-4, cards having PCI devices (mainly peripheral devices) mounted thereon are inserted. The operating frequency of this PCI bus ranges from 33 MHz to 133 MHz, with two types of bus widths, 32 bits and 64 bits. Total bus bandwidths in the both directions per slot become 1 gigabyte per second (GB/s) maximum.

In contrast to this parallel PCI bus, it is considered that a serial-type interconnect will become a mainstream in the near future, because of a low mounting cost in addition to high-speed and large-capacity. Particularly, a PCI Express bus, a serial interconnect bus, has been developed by the PCI-SIG (PCI Special Interest Group) as the successor to the PCI bus. The PCI Express bus is expected to be used in a variety of computer systems, ranging from desktop computers to large-scale servers and storage systems.

FIG. 10 shows a configuration diagram of a computer system using the conventional PCI Express bus. The CPU 100 is connected to the memory 104 via the memory controller 102. This memory controller 102 has a plurality of PCI Express buses 110-1-110-4. A card having a PCI Express bus device mounted thereon can be installed on each PCI Express bus slot 106-1-106-4.

These PCI Express buses 110-1-110-4 are serial transfer buses each having an upward path and a downward path, mutually separated from each other. Because of differential type, the number of signal lines is four in total. To perform packet transfer serially, the bandwidth per slot is 1 GB/s in one direction, which is twice as large as the bandwidth provided in the PCI bus.

As such, because the number of signal lines in the PCI Express bus is smaller than in the PCI bus, reduction of chip sets, wires on a substrate and a connector size can be attained, each contributing to the cost reduction. At the same time, the bandwidth provision more than twice as large as the PCI bandwidth can satisfy requirements of high speed and high performance.

This PCI Express bus logically inherits the PCI bus architecture (the connection of peripheral devices). According to the standard of the PCI Express bus, similarly to a USB hub, one port in a switch for switching a connection path in the memory controller acts a special role, such as for the initialization of the overall system, which is termed 'upstream port'. (For example, refer to the Japanese Unexamined Patent Publication No. 2001-229119).

In normal cases, in the configuration shown in FIG. 10, one CPU 100 is connected to the upstream port so as to use the PCI Express bus (namely, a serial interconnect bus for peripheral devices), because one CPU 100 connects to peripheral devices.

As described above, the serial interconnect such as the PCI Express bus is expected to be used in a various field as high-performance and low-cost interconnect. However, originally, the PCI Express bus has been aimed at connecting peripheral devices to a CPU. When the PCI Express bus is aimed at use for interconnecting a plurality of CPUs, there is a problem to be solved when it is intended to apply the PCI Express bus without modification.

Namely, when connecting a plurality of CPU nodes using a PCI Express switch having a plurality of ports, a privileged role is assigned to a particular CPU node which is connected to the upstream port of the switch. Without this CPU node, the PCI Express switch cannot perform an initialization operation (link establishment).

Meanwhile, in a server or a storage system constituted of a plurality of CPU nodes, in order to increase flexibility, CPU nodes are treated as units of which number can be either increased or decreased depending on a product configuration. Therefore, if this particular CPU does not exist in the system, the switch cannot be operated, and as a result the system cannot be operated. So, it becomes difficult to increase or decrease CPU nodes freely. Such a situation has to be avoided if possible.

Further, when a malfunction occurs in the CPU node connected to the upstream port, the PCI Express switch cannot be operated, which also causes difficulty in the system operation.

SUMMARY OF THE INVENTION

Accordingly, it is an object of the present invention to provide a computer system using a serial connect bus, enabling interconnection among a plurality of CPU nodes via a serial connect switch by hiding a peculiarity of the upstream port of a serial connect switch, and to provide a method for interconnecting a plurality of CPU units using a serial connect bus.

It is another object of the present invention to provide a computer system using a serial connect bus even when a CPU node is not connected to the upstream port of a serial connect switch, enabling link establishment to other CPU nodes being connected to the serial connect switch, and to provide a method for interconnecting a plurality of CPU units using a serial connect bus.

It is still another object of the present invention to provide a computer system using a serial connect bus even when a CPU node, being connected to the upstream port of a serial connect switch, does not work normally, enabling link establishment to other CPU nodes being connected to the serial connect switch, and to provide a method for interconnecting a plurality of CPU units using a serial connect bus.

In order to achieve the aforementioned objects, a computer system in accordance with the present invention includes a plurality of CPU units and a switch unit having a plurality of ports for interconnecting each CPU unit connected to the ports by a serial connect bus. The switch unit includes a serial connect switch having one of the plurality of ports being set as upstream port and a management controller judging link establishment of the upstream port, and when the link establishment fails, working as upstream device of the serial connect switch.

An interconnection method in accordance with the present invention is a method for interconnecting a plurality of CPU units by a serial connect bus via a switch unit having a plurality of ports. The method includes the steps of judging link establishment between a serial connect switch, in which one of the plurality of ports is set as upstream port, and a connection destination of the serial connect bus; and when the link establishment fails, executing the link establishment sequence by a management controller which works as upstream device of the serial connect switch.

According to the present invention, preferably, the serial connect bus is a PCI Express bus, and the serial connect switch is a PCI Express switch.

According to the present invention, preferably, the switch unit further includes a switch circuit switching the serial connect switch to either the management controller or an external port of the switch unit. On deciding the link establishment fails, the management controller switches the switch circuit, so as to be connected to the management controller.

According to the present invention, preferably, the management controller releases the reset of the serial connect switch, and the serial connect switch executes a link establishment sequence to an external unit being connected to the upstream port, in response to the reset release.

According to the present invention, preferably, each CPU unit connected to the switch unit includes a second management controller being connected to the management controller of the switch unit via a communication path. The management controller of the switch unit performs synchronization between the switch unit and each CPU unit by communicating with the second management controller of each CPU unit, and releases the reset.

According to the present invention, preferably, on deciding the link establishment is successful, the management controller of the switch unit reports the success to the second management controller of the CPU unit via the communication path, and the second management controller of the CPU unit initiates the CPU unit according to the report.

According to the present invention, preferably, the switch circuit includes a selection circuit selecting the inputs and the outputs of the serial connect switch to be connected to either the management controller or the external port of the switch unit; and a strap port, connected to the selection circuit, receiving a selection signal from the management controller of the switch unit.

According to the present invention, preferably, the switch circuit includes a selection circuit selecting the inputs and the outputs of the serial connect switch to be connected to either the management controller or the external port of the switch unit and an internal register, connected to the selection circuit, receiving a selection signal from the management controller of the switch unit.

According to the present invention, preferably, each CPU unit includes a storage server controlling the plurality of storage devices. Each storage server exchanges data via the switch unit.

According to the present invention, preferably, each storage server transfers write data received from a host computer connected to each storage server to another storage server via the switch unit.

Further scopes and features of the present invention will become more apparent by the following description of the embodiments with the accompanied drawings.

BRIEF DESCRIPTION OF THE DRAWINGS

FIG. 3 shows an explanation diagram of an address map including routing shown in FIG. 1.

DETAILED DESCRIPTION OF THE INVENTION

The preferred embodiment of the present invention is described hereinafter referring to the charts and drawings, in order of a computer system, initialization of a serial connect bus, and other embodiments.

Computer System

Figure 1:
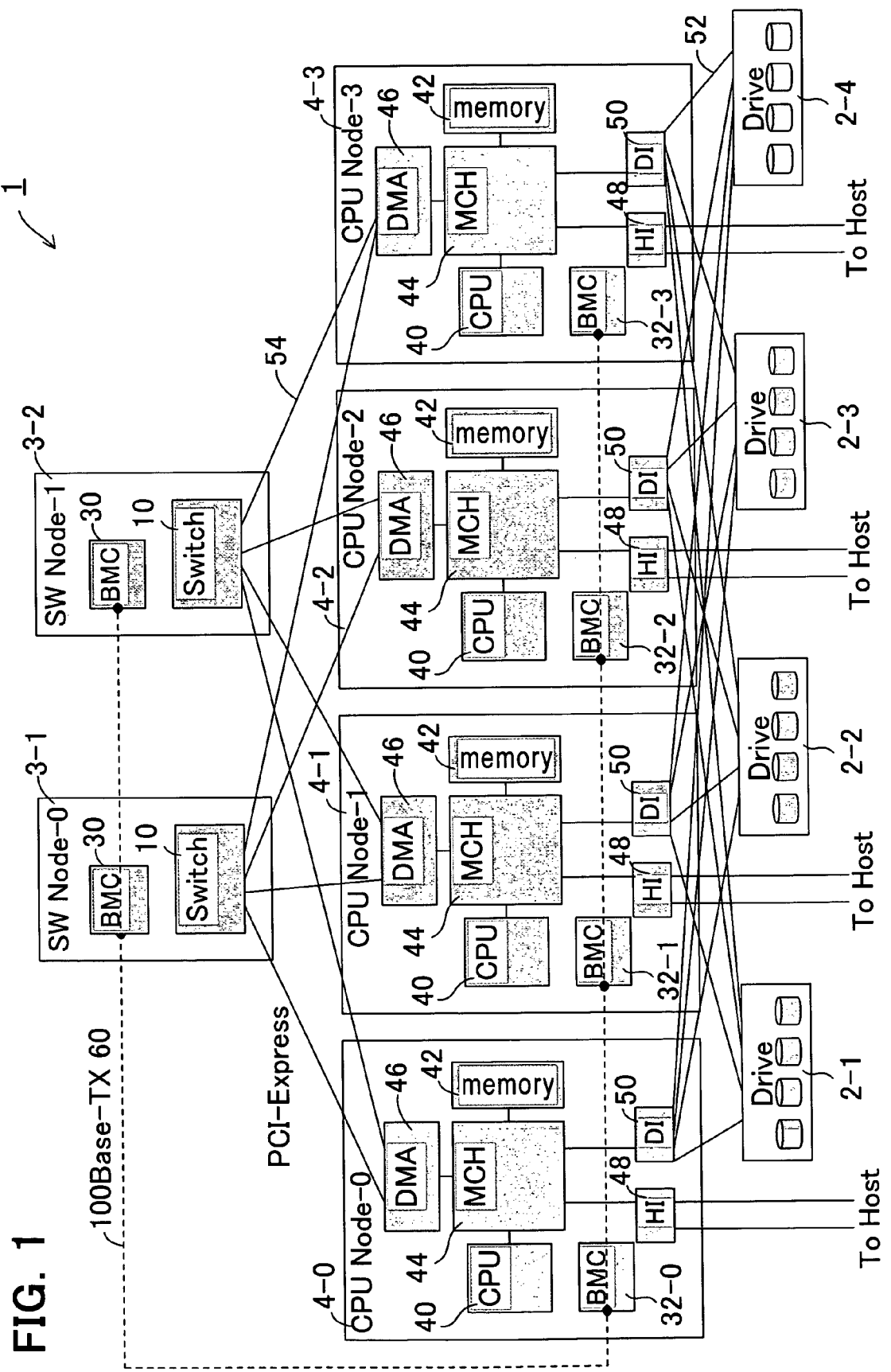
FIG. 1 shows a configuration diagram of a computer system according to one embodiment of the present invention.
Figure 2:
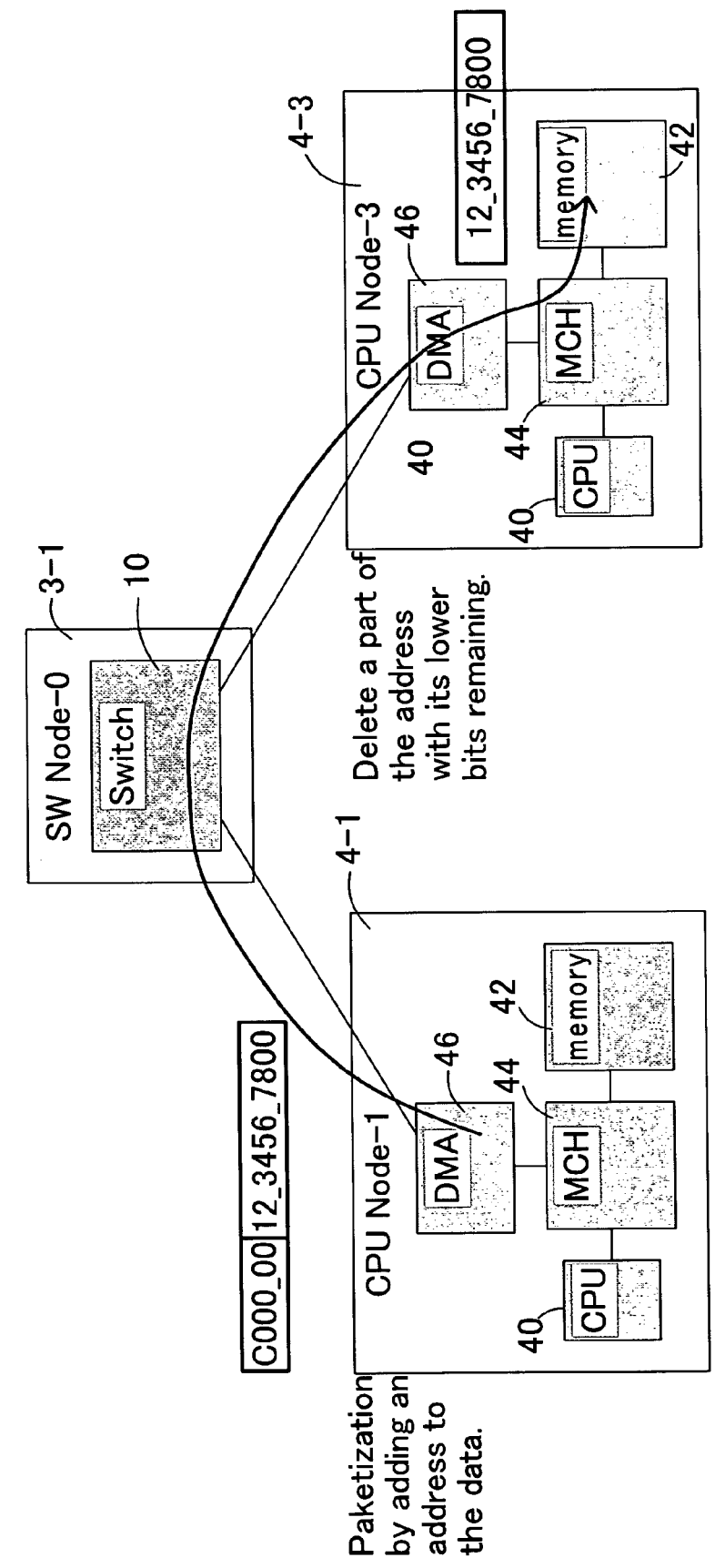
FIG. 2 shows an explanation diagram illustrating an interconnect operation between the CPU units shown in FIG. 1.

FIG. 1 is a configuration diagram of a computer system according to one embodiment of the present invention; FIG. 2 is an explanation diagram of a connection operation using a PCI Express switch shown in FIG. 1; and FIG. 3 is an address map diagram of each CPU unit viewed from the DMA shown in FIG. 1. Although the embodiment shown in FIG. 1 illustrates a disk array unit as an exemplary computer system, the application field of the present invention is not limited to the disk array unit.

As shown in FIG. 1, a disk array unit 1 includes four CPU units (nodes) 4-0-4-3 and two switch units 3-1, 3-2. CPUs 4-0-4-3 are connected to switch units 3-1, 3-2 via PCI Express buses 54.

Four CPU units 4-0-4-3 constitute a storage control module (CM), each having a plurality of ports in a host interface (HI) 48 and a disk interface (DI) 50. The host interface 48 uses a variety of protocols such as fiber channel, iSCSI, ESCON, etc., depending on connected host types and data transfer purposes.

The disk interface 50 is connected to a plurality of disk enclosures 2-1-2-4 with the cables 52. According to the disk types used, protocols such as fiber channel, serial ATA are used in the disk interface 50. A plurality of the disk storage drives (for example, 15 hard disk drives) are mounted on each disk enclosure 2-1-2-4.

Further, each CPU unit 4-0-4-3 includes CPU 40, memory (having a cache area) 42, DMA (direct memory access) circuit 46, and memory controller (MCH) 44. Through this memory controller 44, the CPU 40, the memory (having the cache area) 42, the DMA circuit 46, the host interface 48 and the disk interface 50 are interconnected.

Further, board management controllers (BMCs) 32-0, 32-1, 32-2 and 32-3 are mounted on the CPU units 4-0-4-3, respectively. Also, board management controllers 30 are mounted on the respective switch units 3-1, 3-2. The BMCs 32-0-32-3 and 30 are mutually connected through a communication channel (a communication path) 60, which is dedicatedly provided for the communication therebetween. According to this embodiment of the present invention, each BMC is connected with Ethernet (registered trademark) (100Base-TX) for the above communication.

The board management controllers (BMC) 32-0-32-3 and 30 perform reset release, initialization, etc. of each device (here, units 4-0-4-3, 3-1 and 3-2) mounted on the boards, which will be described later.

Next, the operation of this disk array unit 1 is described. Each CPU unit 4-0-4-3 receives read/write commands from a host computer through the host interface 48, and performs data read/write processing. Namely, each CPU unit 4-0-4-3 writes user data received from the host computer into a disk according to a write request, and reads out user data from a disk according to a read request received from the host computer.

At this time, each CPU unit 4-0-4-3 acts a role of disk cache for each host computer. More specifically, each CPU unit 4-0-4-3 does not immediately write the data received from each host computer into the disk. Instead, each CPU unit 4-0-4-3 stores the data into a cache area in the memory 42. On receipt of a read request, each CPU unit 4-0-4-3 replies by reading out the data from the memory 42, not from the disk. With this, the response speed viewed from the host computer can be made faster.

When a user data of a read request is not existent in the cache area of the memory 42, the relevant CPU unit 4-0-4-3 issues, through the disk interface 50, a read request to the disk drive having the relevant data stored therein, reads out the data from the disk drive. And the CPU unit stores the readout data into the cache area of the memory 42, and then, transmits the readout data to the host computer.

Similarly, as to write data stored in the cache area of the memory 42, a write process to write into the disk drive in which the data is to be stored is performed via the disk interface 50, according to the internal schedule of the CPU unit (which is termed write-back).

As described above, caching into the memory 42 the data to be preserved in the disk enables a high response speed. However, the memory 42 is a storage unit of which reliability is far inferior, as compared to the disk 2-1. In addition, since the memory 42 is a volatile memory, there is a risk of data loss in the event of a power failure or the like.

To avoid such a risk, the cache data is mirrored in the disk array unit 1. That is, a user data received by one CPU unit (which is called 'master') is stored in the memory 42 of the CPU unit concerned, and also copied in the memory 42 of another CPU unit (which is called 'slave').

With the above means, even when a data in the memory 42 of the master is lost, it becomes possible to respond to a request from the host computer, using the data stored in the memory 42 of the slave.

When this CPU unit copies the data into the memory 42 of the other CPU unit, a packetized data is transferred via the switch unit 3-1 (3-2) by use of the DMA function. When transferring the data by the DMA circuit 46, the data and the address are packed into a single packet. This address includes a memory address in the CPU unit of transfer destination, and a routing address for use in the switch unit.

Referring to FIG. 2, two addresses handled by the above-mentioned DMA function will be explained in the following, taking as an example a case such that CPU unit 4-1 writes a data into the memory 42 of CPU unit 4-3.

A memory address in each CPU unit 4-0-4-3 is specified by 40 bits (by which one terabyte, a sufficient capacity even in a large-scale storage system, is addressable.) A switch 10 in the switch unit 3-1 (3-2) can handle 64-bit addresses. It is configured that an address of transfer destination in a received packet is determined by the uppermost 2 bits (address [63:62]) of a 64-bit address. When the address [63:62] is '0x00', the packet is transferred to CPU unit 4-0. Similarly, the packet is transferred to CPU unit 4-1 when the address is '0x01', to CPU unit 4-2 when the address is '0x02', and to CPU unit 4-3 when the address is '0x03'.

In the example shown in FIG. 2, when writing a data into the memory of CPU unit 4-3, of which address is '0012_3456_7800', DMA circuit 46 in CPU unit 4-1 specifies '0xC000_0012_3456_7800' as an address to be added to the packet. The switch 10 in the switch unit 3-1 analyzes the packet address, and using the uppermost 2 bits of the address as a routing address, transfers the packet to the CPU unit 4-3.

On receiving the packet, the DMA circuit 46 in the CPU unit 4-3 extracts the lower 40 bits of the address, namely, '12_3456_7800' only. The DMA circuit 46 then passes the extracted address to the memory controller 44. The memory controller 44 stores the accompanying copy data into the above address of the memory 42, accordingly.

FIG. 3 is an address map viewed from the DMA 46 of each CPU units 4-0-4-3 (0-3). Namely, in order to use the uppermost 2 bits as routing address, the combination of an address range with CPU (CM) units 4-0-4-3 (0-3) shown below is set.

(0x0000_0000_0000_0000-
  0x3FFF_FFFF_FFFF_FFFF) . . . CM unit 0
(0x4000_0000_0000_0000-
  0x7FFF_FFFF_FFFF_FFFF) . . . CM unit 1
(0x8000_0000_0000_0000-
  0xBFFF_FFFF_FFFF_FFFF) . . . CM unit 2
(0xC000_0000_0000_0000-
  0xFFFF_FFFF_FFFF_FFFF) . . . CM unit 3

Initialization of Serial Connect Switch

Since the above-mentioned switch 10 provided for switch operation is a PCI Express switch, initialization is necessary for establishing the link to each CPU unit 4-0-4-3, by means of a link establishment sequence operation initiated from the upstream port.

Figure 4:
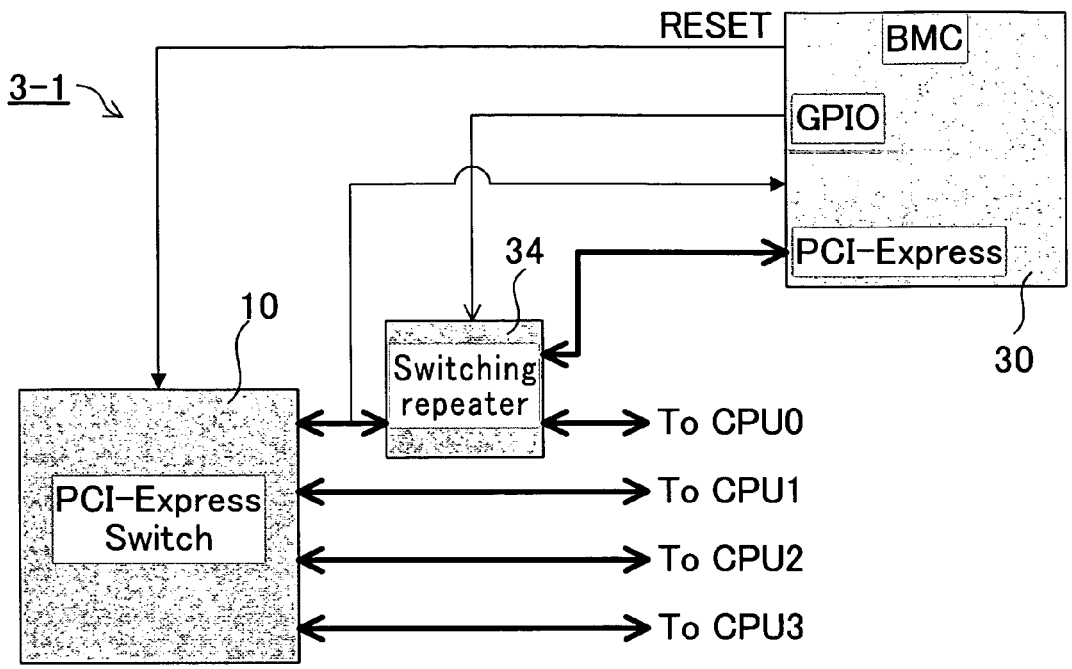
FIG. 4 shows a configuration diagram of the switch unit shown in FIG. 1.
Figure 5:
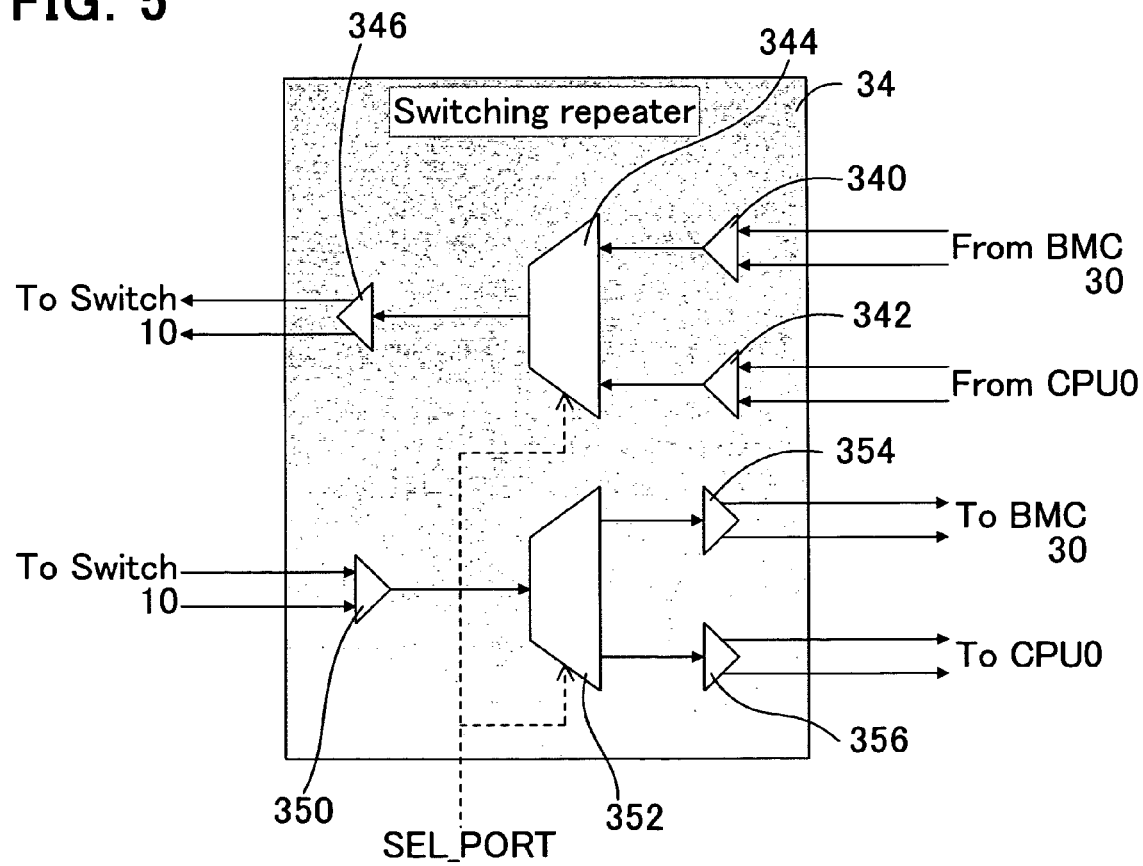
FIG. 5 shows a configuration diagram of the switching repeater shown in FIG. 4.

FIG. 4 is a block diagram of the switch unit 3-1, and FIG. 5 is a circuit diagram of a switching repeater 34 shown in FIG. 4. As shown in FIG. 4, the PCI Express switch unit 3-1 includes PCI Express switch 10 performing the operation described above, the BMC 30, and switching repeater 34. The other PCI Express switch unit 3-2 shown in FIG. 1 has the same configuration as the PCI Express switch unit 3-1.

The BMC 30 is constituted of a processor, and includes a PCI Express port, one GPIO (general purpose input/output), and a reset output port. The PCI Express port is connected to one port of the switching repeater 34. The GPIO is connected to a selection (SEL) port of the switching repeater 34. The reset output port is connected to a reset port of the PCI Express switch 10. Further, the BMC 30 receives an input/output signal on the upstream port of the PCI Express switch 10, and monitors a link establishment state of the upstream port.

The PCI Express switch 10 has four ports, each being connected to each CPU unit 4-0-4-3 (shown as CPU 0-3 in FIG. 4). Here, as to the connection to CPU 4-0 only, the switching repeater 34 intervenes between the PCI Express switch 10 and the CPU 4-0. In other words, the switching repeater 34 intervenes on the upstream port. This switching repeater 34 selects the opposite party of the switch connection from between CPU unit 4-0 (0) and BMC 30.

As shown in FIG. 5, the switching repeater 34 is an IC which does not influence the protocol. The switching repeater 34 has a function of receiving a high-speed differential signal of 2.5 gigabits per second (Gbps), as defined in the PCI Express standard, and outputting a differential signal having the same speed of 2.5 Gbps. This switching repeater 34 is provided mainly for waveform shaping, and has a static switching function as well. The switching repeater 34 can select either of the two input/outputs by switching the selection (SEL) port to '0' or '1'.

The above is explained more specifically, referring to FIG. 5. As for the upward direction to the switch 10, the switching repeater 34 includes differential amplifiers 340, 342 for generating a differential output on receipt of pair signals from the BMC 30 and the CPU unit 4-0 (0), respectively; a selector 344 for selecting either one of the outputs from the differential amplifiers 340, 342; and a converter 346 for converting the output of the selector 344 into a pair signal.

Also, as for the downward direction from the switch 10, the switching repeater 34 includes a differential amplifier 350 for generating a differential output on receiving a pair signal from the switch 10; a selector 352 for selecting the transfer destination of the output of the differential amplifier 350; and converters 354, 356 for converting the outputs of the selector 352 into pair signals, respectively, and outputting to either the BMC 30 or the CPU unit 4-0 (0). The above-mentioned selectors 344, 352 are selected by the selection signal on the selection (SEL) port being sent from the BMC 30.

Figure 6:
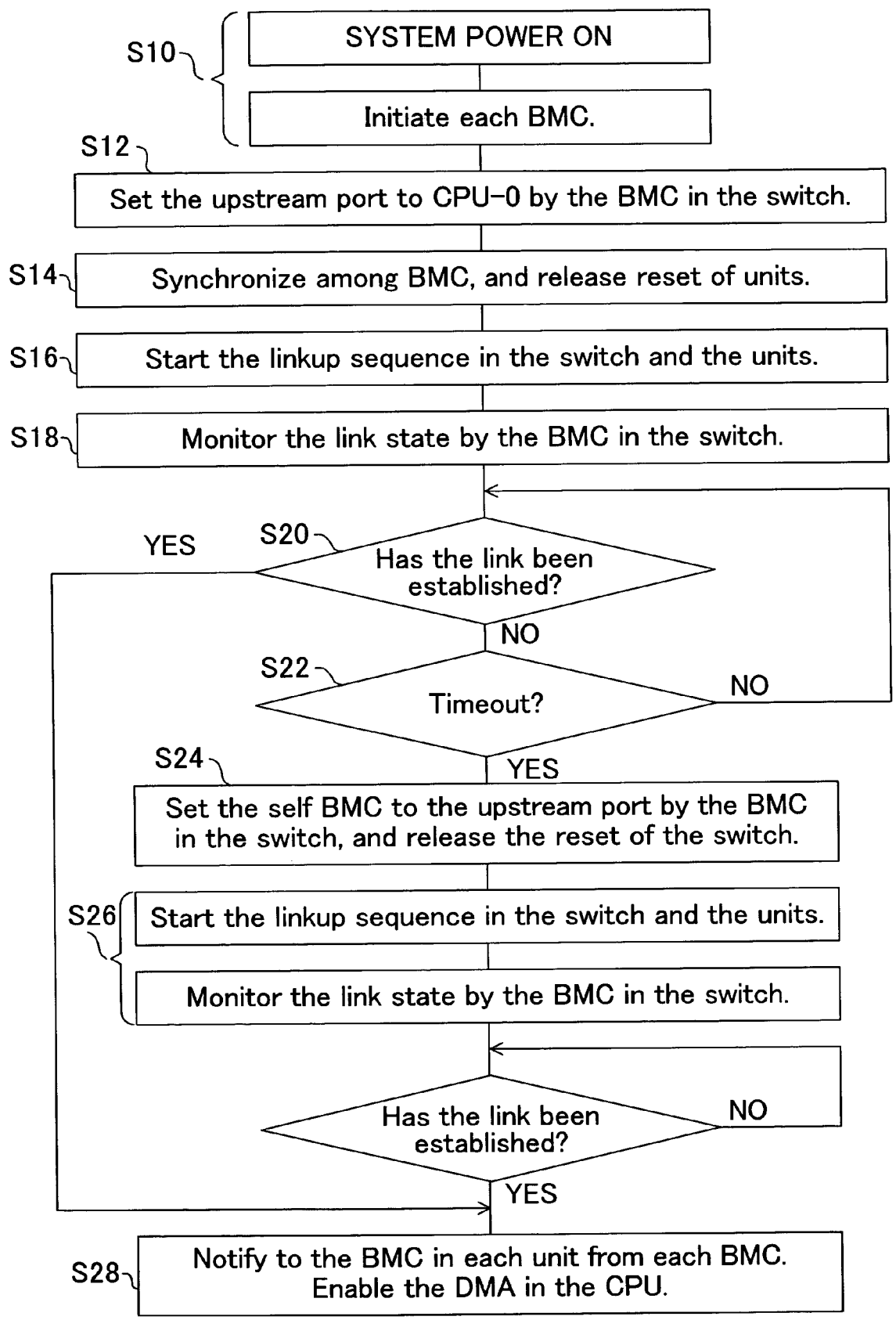
FIG. 6 shows a flowchart of initialization processing in the configuration shown in FIGS. 1 and 4.
Figure 7:
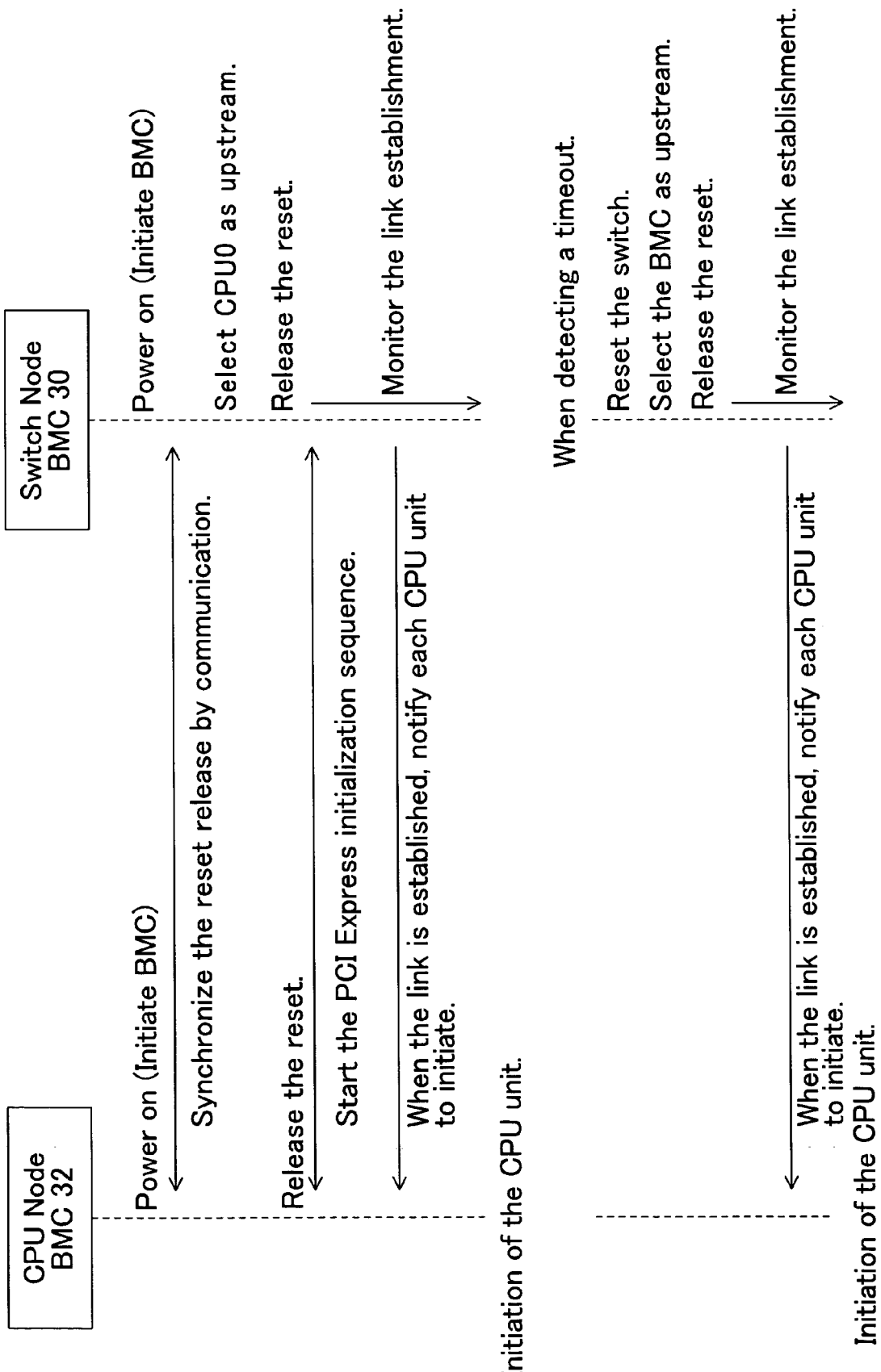
FIG. 7 shows an explanation diagram of a sequence of the initialization processing shown in FIG. 7.

Next, the initialization processing will be explained. The initialization processing uses the BMC 30 provided in the switch unit 3-1 and the BMCs 32-0-32-3 respectively provided in the CPU units 4-0-4-3. FIG. 6 is an initialization processing flowchart of the switch unit 3-1 (3-2) and the CPU units 4-0-4-3, and FIG. 7 is an explanation diagram of an operation sequence shown in FIG. 6. The initialization processing shown in FIG. 6 is explained referring to FIG. 7.

(S10) When the power is switched on in the system, the BMCs 30, 32-0-32-3 in the units 3-1, 3-2 and 4-0-4-3 start operation.

(S12) The BMC 30 in the switch unit 3-1 (3-2) sets the upstream port of the switch 10 to CPU unit 4-0 (0). Namely, the BMC 30 supplies a selection signal of the CPU 4-0 (for example, '0') on the selection (SEL) port of the switching repeater 34, thereby indicating to select the CPU 4-0 (0). More specifically, by a setting, the switching repeater 34 connected to the upstream port of the switch 10 can select either one of the CPU unit 4-0 and the BMC 30 in the switch unit 3-1 to be connected to the switch 10, as described above. In an initial condition, the switching repeater 34 selects the CPU 4-0.

(S14) Next, the BMCs 30 and 32-0-32-3 in the respective units 3-1, 3-2 and 4-0-4-3 release the resets in the respective units 3-1, 3-2 and 4-0-4-3, in synchronization with one another using the communication path 60.

(S16) If the CPU unit 4-0 connected to the upstream port operates normally, a PCI Express link function in switch 10 and a PCI Express link function in the CPU unit 4-0 (in more detail, the DMA circuit 46) automatically start each initialization sequence. Thus, the link is established and becomes operational. Following the above link establishment by the upstream port, the ports other than the upstream port in the switch 10 perform each initialization sequence. Thus, the link establishment is completed, and the overall system becomes operational.

If the CPU 4-0 does not exist or does not work normally, the PCI Express link between the switch 10 and the CPU unit 4-0 is not established. As a result, the remaining ports in the switch 10 cannot start the initialization sequence, and the entire system is unable to work.

(S18) To avoid the above situation, after releasing the reset state, the BMC 30 in the switch unit 3-1 starts monitoring whether or not the link of the switch 10 has been established. Namely, after the release of the reset state, the BMC 30 monitors a 'link establishment state output signal', which is to appear in the input/output signals on the upstream port of the switch 10.

(S20) The BMC 30 decides whether this link establishment state output signal indicates the link is established. On deciding that the link establishment is indicated, the process proceeds to step S28.

(S22) On the other hand, if the BMC 30 decides the link is not established, the BMC 30 decides whether a time in a monitoring timer, which is started from the reset release time, expires. If the timeout does not occur yet, the process returns to step S20.

(S24) When the BMC 30 decides the occurrence of timeout, that is, when the link has not been established within a certain time period, the BMC 30 sets the switching repeater 34 so as to connect the self BMC 30 to the upstream port. The BMC 30 also resets the switch 10 again. Namely, the BMC 30 outputs a selection signal of the BMC 30 (for example, '1') onto the selection (SEL) port of the switching repeater 34, thereby the switching selectors 344, 352 to the BMC 30 side (that is, connects the upstream port to the BMC 30). Also, the BMC 30 outputs a reset signal to the switch 10.

(S26) When the reset is released, similarly to step S16, the link initiation sequence is started in the switch 10 and the BMC 30. The BMC 30 then monitors the link establishment state in a similar way.

(S28) Thus, the link between the BMC 30 and the PCI Express switch 10 in the switch unit 3-1 is established, and the PCI Express links between the switch unit 3-1 and the CPU units 4-1-4-3 are established succeedingly. As a result, the system becomes operational. On deciding the links have been established, the BMC 30 notifies the BMCs 32-1-32-3 in the respective CPU units 4-1-4-3 of the link establishment, via the communication path 60. On receipt of the notification from the BMC 30 of the switch unit 3-1, the BMCs 32-1-32-32-3 in the CPU units 4-1-4-3 initiate the CPU units 4-1-4-3, respectively. For example, these initiation operations are performed by enabling DMA function in the CPU 40.

In such a way, the BMC monitors whether or not the links of the switch 10 has been established during the linkup sequence of the switch and the CPU units performed after the reset release of the CPU units. If the link cannot be established within a certain time period, the BMC connects the self BMC to the upstream port, and performs the linkup sequence in place of the CPU unit.

Therefore, even the CPU unit is not connected to the upstream port, or the connected CPU unit is faulty, the links to other CPUs can be established normally using the switch 10, and the system operation by use of the switch 10 can be attained.

Namely, in a computer system having a plurality of CPU nodes combined together using a PCI Express switch, the peculiarity of an upstream port proper to the PCI Express standard can be hidden, and system operation can be attained corresponding to an addition or deletion of CPU nodes.

Further, by providing the switching repeater 34 on the upstream port, and by providing in the BMC 30 a link establishment monitoring function, a switching function of the switching repeater 34, and a linkup sequence function, the system can be structured easily at low cost.

Other Embodiments

Figure 8:
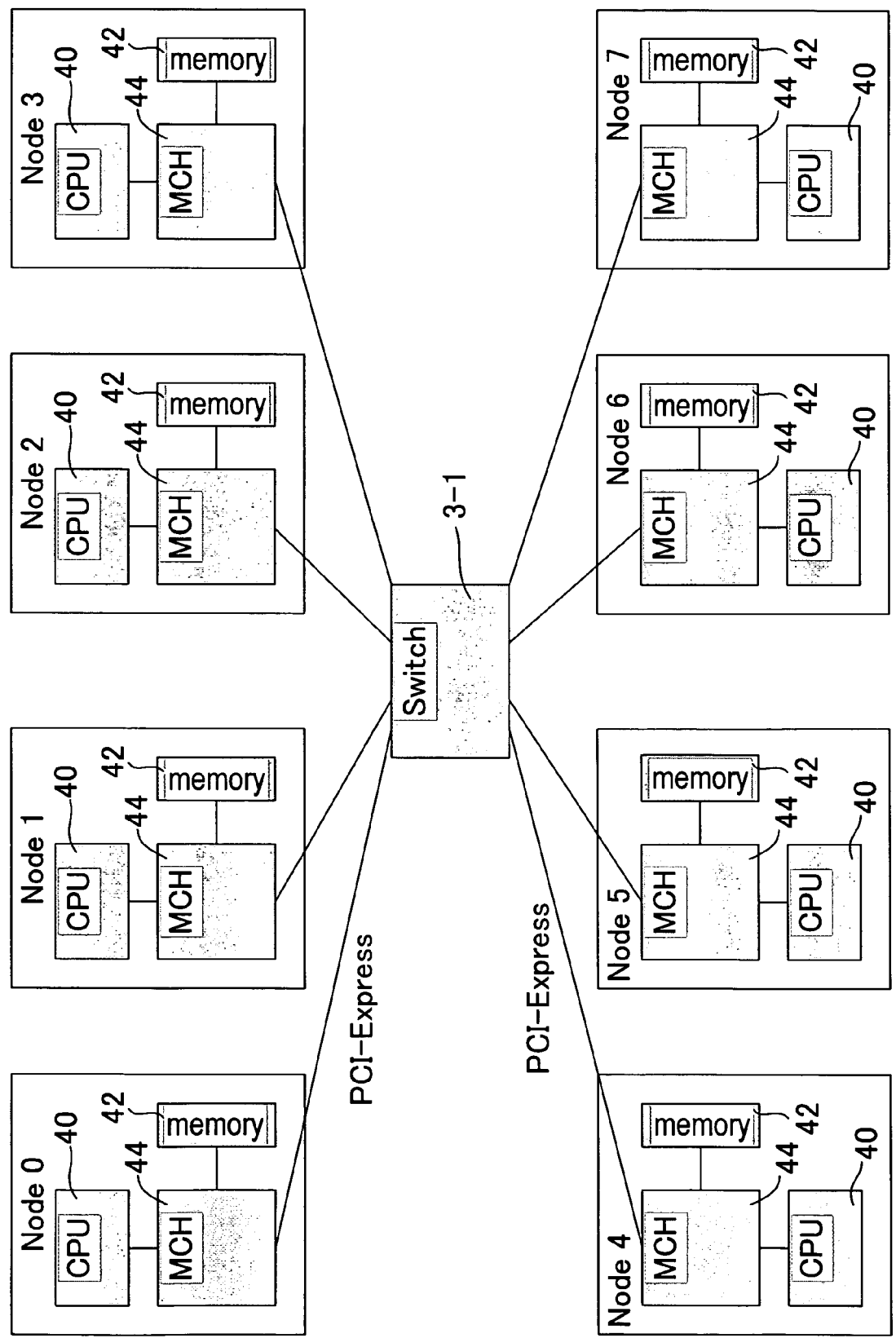
FIG. 8 shows a configuration diagram of a computer system according to another embodiment of the present invention.
Figure 9:
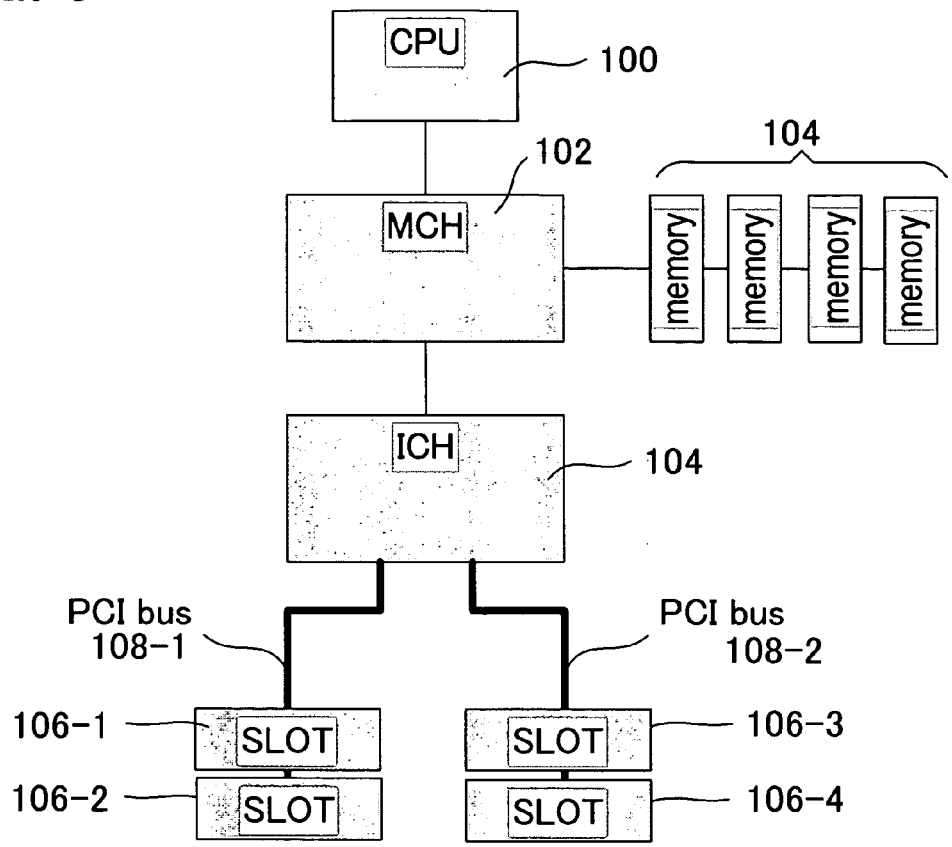
FIG. 9 shows a block diagram of a computer system using the conventional PCI bus.
Figure 10:
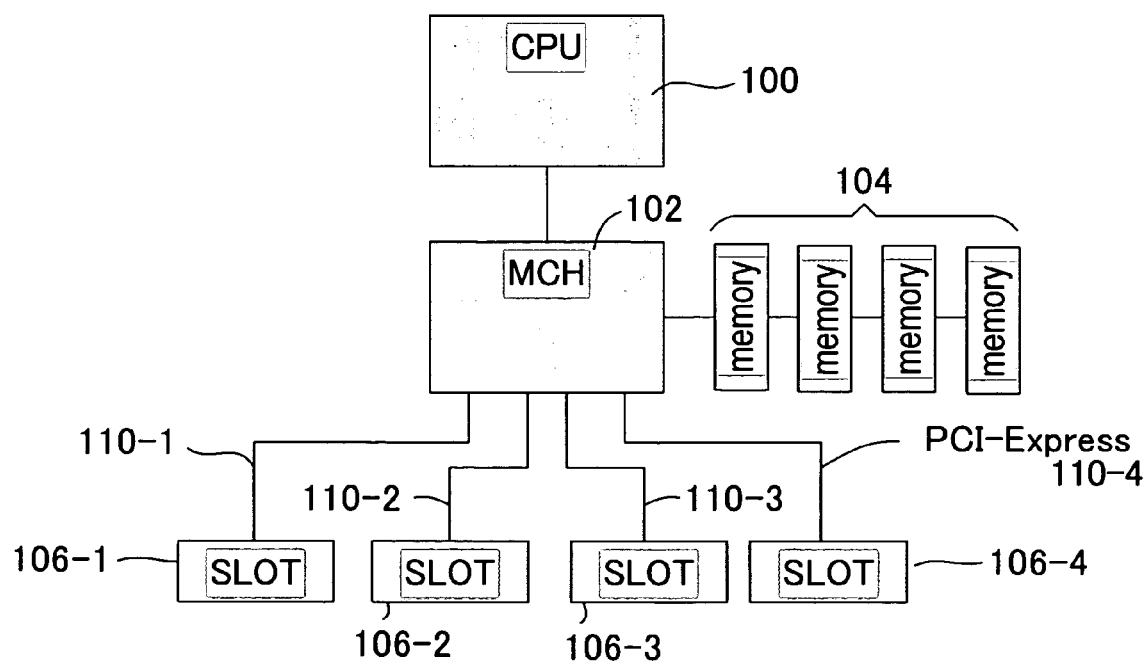
FIG. 10 shows a configuration diagram of a computer system using the conventional PCI Express bus.

FIG. 8 is a computer system configuration according to another embodiment of the present invention. As shown in this FIG. 8, the computer system is constituted of eight CPU units (nodes) 0-7, and one switch unit 3-1. CPU units (nodes) 0-7 are connected to switch unit 3-1 through a PCI Express bus 54.

Further, each CPU unit 0-7 includes a CPU 40, a memory 42, and a memory controller (MCH) 44 having a DMA (direct memory access) circuit.

In this embodiment also, similar to FIGS. 1, 4 and 5, a BMC 30 and a switching repeater 34 are provided in switch unit 3-1, and BMCs 32-0-32-7 are provided in respective CPU nodes 0-7. With the above configuration, it is also possible to realize the substitutive operation shown in FIGS. 6, 7.

In the aforementioned embodiments, the signal lines in the computer system are described using the PCI Express bus. However, it is also possible to use other high-speed serial buses, such as Rapid-IO. The number of channel adaptors in the control module and the number of disk adaptors can either be increased or decreased, depending on the needs. Similarly, in the above description, the connection destination of the switching repeater is selected using the selection port. However, it is also possible to select the connection destination by setting an internal register in the switching repeater. In this case, preferably, BMC 30 changes the connection destination by accessing the internal register via communication path 60.

Moreover, as disk drive, any storage device including hard disk drive, optical disk drive, magneto-optical disk drive is applicable. Further, the configurations of the storage system and the computer system are not limited to the configurations shown in FIGS. 1 and 8, and other configurations may also be applicable.

To summarize, in a computer system having a plurality of CPU units connected one another, using a serial connect switch, in case links cannot be established because of an inoperable condition of the CPU unit being connected to the upstream port of the serial connect switch, by means of a switch over, a management controller provided in the switch unit is selected as a device for the upstream port. Thus, the system becomes operational even when the product is configured of an arbitrary number of CPU units. Namely, a peculiarity of the upstream port can be hidden, and the system operation can be attained corresponding to the addition and deletion of the CPU nodes.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A computer system, comprising:
a plurality of CPU units;
a serial connect switch unit having at least three ports and for interconnecting each CPU unit being connected to each port by a serial connect bus, said serial connect switch having one of said at least three ports being set as an upstream port for connecting an upstream device that executes link establishment with each of said CPU units connected to said ports except the upstream port;
a management controller judging link establishment of the upstream port, and when judging that the link establishment fails, executing said link establishment with each of said CPU units connected to said ports except the upstream port as said upstream device of the serial connect switch; and
a switch circuit switching the upstream port of the serial connect switch to either one of the manager controller and said upstream device,
wherein said manager controller switches the switch circuit so as to connect the upstream port of the serial connect switch to the manager controller when judging that link establishment fails.

2. The computer system according to claim 1, wherein the serial connect bus is a PCI Express bus, and the serial connect switch is a PCI Express switch.

3. The computer system according to claim 1, wherein:
the management controller releases the reset of the serial connect switch, and
the serial connect switch executes a link establishment sequence to an external unit being connected to the upstream port, in response to the reset release.

4. The computer system according to claim 3, wherein:
each CPU unit comprises a second management controller connected to the management controller of the switch unit via a communication path, and
the management controller of the switch unit performs synchronization between the switch unit and each CPU unit by communicating with the second management controller of each CPU unit, and releases the reset.

5. The computer system according to claim 3, wherein:
when the management controller judges that the link establishment is successful, the management controller of the switch unit reports the success to the second management controller of the CPU unit via the communication path, and
the second management controller of the CPU unit initiates the CPU unit according to the report.

6. The computer system according to claim 1, wherein the switch circuit comprises:
a selection circuit selecting the inputs and the outputs of the serial connect switch to be connected to either the management controller or the external port of the switch unit; and
a strap port, connected to the selection circuit, receiving a selection signal from the management controller of the switch unit.

7. The computer system according to claim 1, wherein the switch circuit comprises:
a selection circuit selecting the inputs and the outputs of the serial connect switch to be connected to either the management controller or the external port of the switch unit; and an internal register, connected to the selection circuit, receiving a selection signal from the management controller of the switch unit.

8. The computer system according to claim 1, wherein each CPU unit comprises:
a storage server controlling the plurality of storage devices and exchanging data via the switch unit to another storage server of another CPU unit.

9. The computer system according to claim 8, wherein:
each storage server transfers write data received from a host computer connected to each storage server to another storage server via the switch unit.

10. A method for interconnecting a plurality of CPU units by a serial connect bus via a switch unit having at least three ports, comprising:
judging a success of the link establishment between a serial connect switch, in which one of the at least three ports is set as an upstream port for connecting an upstream device that executes link establishment with each of said CPU units connected to said ports except the upstream port, and a connection destination of the serial connect bus by a management controller which works as said upstream device of the serial connect switch;
switching the upstream port of the serial connect switch from said upstream device to the manager controller when the judging has determined that the link establishment failed; and
executing the link establishment with each said CPU units connected to said ports except the upstream port by said management controller.

11. The method for interconnecting the plurality of CPU units by the serial connect bus according to claim 10, wherein the executing further comprises:
executing the link establishment sequence between each CPU unit and a PCI Express switch provided as the serial connect switch, through a PCI Express bus provided as the serial connect bus.

12. The method for interconnecting the plurality of CPU units by the serial connect bus according to claim 10, wherein the executing further comprises:
releasing the reset of the serial connect switch by means of the management controller; and
executing a link establishment sequence to an external unit being connected to the upstream port by the serial connect switch.

13. The method for interconnecting the plurality of CPU units by the serial connect bus according to claim 12, further comprising: releasing the reset by synchronizing the switch unit with each CPU unit by communicating the management controller of the switch unit with the second management controller of each CPU unit connected to the switch unit.

14. The method for interconnecting the plurality of CPU units by the serial connect bus according to claim 12, further comprising: reporting the success to the management controller of each CPU unit via the communication path when successful link establishment is decided by the management controller of the switch unit; and
initiating the CPU unit by the management controller of the CPU unit according to the report.

15. The method for interconnecting the plurality of CPU units by the serial connect bus according to claim 10, wherein the switching step further comprises: switching the selection circuit for selecting the inputs and the outputs of the serial connect switch to be connected to either the management controller or the external port of the switch unit, using a selection signal on a strap port receiving the selection signal from the management controller of the switch unit.

16. The method for interconnecting the plurality of CPU units by the serial connect bus according to claim 10, wherein the switching further comprises: switching the selection circuit for selecting the inputs and the outputs of the serial connect switch to be connected to either the management controller or the external port of the switch unit, using an internal register state receiving the selection signal from the management controller of the switch unit.

17. The method for interconnecting the plurality of CPU units by the serial connect bus according to claim 10, further comprising: exchanging data via the switch unit by a storage server controlling the plurality of storage devices constituting each CPU unit.

18. The method for interconnecting the plurality of CPU units by the serial connect bus according to claim 17, wherein the exchanging further comprises: transferring write data received from a host computer connected to each server to another storage server via the switch unit.

19. A serial connect switch unit, comprising:
at least three ports for interconnecting CPU units by a serial connect bus, one of said at least three ports being set as an upstream port for connecting an upstream device that executes link establishment with each of the CPU units connected to said ports except the upstream port; and
a management controller judging link establishment with the upstream device, and when judging that the link establishment fails, executing said link establishment of said CPU units to said ports except the upstream port, performing as said upstream device.

* * * * *